United States Patent
Johnson

(10) Patent No.: US 9,184,629 B2
(45) Date of Patent: Nov. 10, 2015

(54) STORED-POWER SYSTEM INCLUDING POWER MANAGEMENT

(75) Inventor: Simon B. Johnson, Bonney Lake, WA (US)

(73) Assignee: ClevX, LLC, Kirkland, WA (US)

( * ) Notice: Subject to any disclaimer, the term of this patent is extended or adjusted under 35 U.S.C. 154(b) by 604 days.

(21) Appl. No.: 12/747,513

(22) PCT Filed: Dec. 10, 2008

(86) PCT No.: PCT/US2008/086301
§ 371 (c)(1),
(2), (4) Date: Jun. 10, 2010

(87) PCT Pub. No.: WO2009/076484
PCT Pub. Date: Jun. 18, 2009

(65) Prior Publication Data
US 2010/0264754 A1    Oct. 21, 2010

Related U.S. Application Data

(60) Provisional application No. 61/012,700, filed on Dec. 10, 2007.

(51) Int. Cl.
*H02J 9/00* (2006.01)
*G06F 1/32* (2006.01)
*H01H 47/00* (2006.01)

(52) U.S. Cl.
CPC ............. *H02J 9/005* (2013.01); *G06F 1/3203* (2013.01); *G06F 1/3231* (2013.01); *G06F 1/3259* (2013.01); *Y02B 60/1253* (2013.01); *Y02B 60/1289* (2013.01); *Y02B 60/148* (2013.01); *Y10T 307/937* (2015.04)

(58) Field of Classification Search
USPC .......................................................... 307/126
See application file for complete search history.

(56) References Cited

U.S. PATENT DOCUMENTS

| 6,873,062 B1* | 3/2005 | Makino ...................... 307/126 |
| 2003/0051177 A1* | 3/2003 | Koo .............................. 713/300 |
| 2004/0060985 A1* | 4/2004 | Feng ............................ 235/454 |
| 2004/0166904 A1* | 8/2004 | Kuo .............................. 455/574 |
| 2007/0029969 A1 | 2/2007 | Wang et al. |
| 2007/0262243 A1* | 11/2007 | cheah et al. ............. 250/214 R |
| 2009/0102294 A1* | 4/2009 | Hodges et al. ............... 307/126 |

FOREIGN PATENT DOCUMENTS

| JP | 2000270472 A | 9/2000 |
| JP | 2007102370 A | 4/2007 |
| KR | 10-0559946 | 3/2006 |

OTHER PUBLICATIONS

International Search Report for International application No. PCT/US2008/086301.

* cited by examiner

*Primary Examiner* — Robert Deberadinis
(74) *Attorney, Agent, or Firm* — Ishimaru & Associates LLP

(57) ABSTRACT

A stored-power system operating method includes: providing a human-input power-up signal from a stored-power source; turning on power for a power-using-system in response to the human-input power-up signal; and waiting for a predetermined power-down signal provided by the power-using system and determined by current to turn off power to the power-using-system to zero power consumption.

20 Claims, 5 Drawing Sheets

STORED-POWER SYSTEM INCLUDING POWER MANAGEMENT

CROSS-REFERENCE TO RELATED APPLICATION(S)

This application claims the benefit of U.S. Provisional Patent Application Ser. No. 61/012,700 filed Dec. 10, 2007, and the subject matter thereof is incorporated herein by reference thereto.

TECHNICAL FIELD

The present invention relates generally to stored-power systems, and more specifically to extending battery life in battery-stored-power systems.

BACKGROUND OF THE INVENTION

Most stored-power systems include some form of power monitoring and management.

For example in some computer and cell phone systems, the system notifies the user that the rechargeable batteries are running down to give the user an opportunity manually shutdown or to connect the device to a re-charger to complete use and save data.

In other systems, a user is given options regarding features that should be enabled or disabled while continuing operation.

In still other systems, the user may specify how long to wait before turning the display off during periods of inactivity, how long to wait before placing the system in a low-power standby mode, at what power level to issue a warning, at what power level to turn the system off, etc.

Some systems include pre-defined profiles, with descriptive names, such as "Power Saver", "Miser", "Long Play", etc. When the user selects one of these profiles, the device is configured using predefined parameters for each of the profiles.

For example, in the "miser" profile, the parameter for turning of an inactive display may be set to several minutes, whereas, in another profile, the parameter may be set to at least an hour. In like manner, a disk drive may be set to turn off during periods of inactivity when the device is operated on battery power, but remain on when the device is connected to an electrical outlet.

A common problem in conventional power management systems is the fixed nature of the criteria used to effect power savings.

For example, when a personal computer is operated in the "miser" power-saving mode, the display is turned off within several minutes of inactivity, regardless of other factors. In like manner, the disk drive is turned off during periods of inactivity whenever the device is on battery power, regardless of other factors.

Further, in other systems, when the power level drops below the specified minimum, the entire system is turned off, or placed in a standby mode, again regardless of other factors.

Further, in still other systems, the power management is based on available power level, and a rapid dissipation of power can induce a power failure that occurs before the power manager can react to the decreased power level.

The personal computer market has evolved dramatically in terms of portability and user access. Portable laptop computers have garnered increasing shares of the market. With this increased emphasis on portability, more stringent demands have been placed on batteries and power saving features to extend battery life.

Even with peripheral pointing devices, portability has become an issue for both laptops and desktop computers.

Wireless optical pointing devices such as mice have also grown in popularity. One drawback to the use of wireless optical mice is continued power consumption even during sleep modes.

Conventional wireless or cordless mice include a power saving circuit that is initiated after a predetermined period of inactivity. These circuits are conventionally designed to cause the mouse to emerge from the power saving mode upon initiation of activity.

Unfortunately, the determination that mouse activity has commenced requires that the mice consume battery power in a standby state.

For example, to determine that mouse activity has recommenced, a series of optical pulses are sent periodically. Although the frequency of these emitted pulses is considerably less than the corresponding frequency during the active mode, the pulses are still emitted at several times per second and result in depletion of the battery.

Solutions to these problems have been long sought but prior developments have not taught or suggested any solutions and, thus, solutions to these problems have long eluded those skilled in the art.

SUMMARY OF THE INVENTION

The present invention provides a stored-power system operating method that includes: providing a human-input power-up signal from a stored-power source; turning on power for a power-using-system in response to the human-input power-up signal; and waiting for a predetermined power-down signal to turn off power to the power-using-system to zero power consumption.

The present invention provides a stored-power-using system including: a power-using-system requiring power from a stored-power source for operation and for providing a power-down signal; a human-input sensor for providing a human-input power-up signal from the stored-power source; and a power control for turning on power to the power-using-system in response to the human-input power-up signal and waiting for a predetermined power-down signal to turn off power to the power-using-system to zero power consumption.

Certain embodiments of the invention have other aspects in addition to or in place of those mentioned above. The aspects will become apparent to those skilled in the art from a reading of the following detailed description when taken with reference to the accompanying drawings.

DESCRIPTION OF THE BEST MODES

Figure 1:
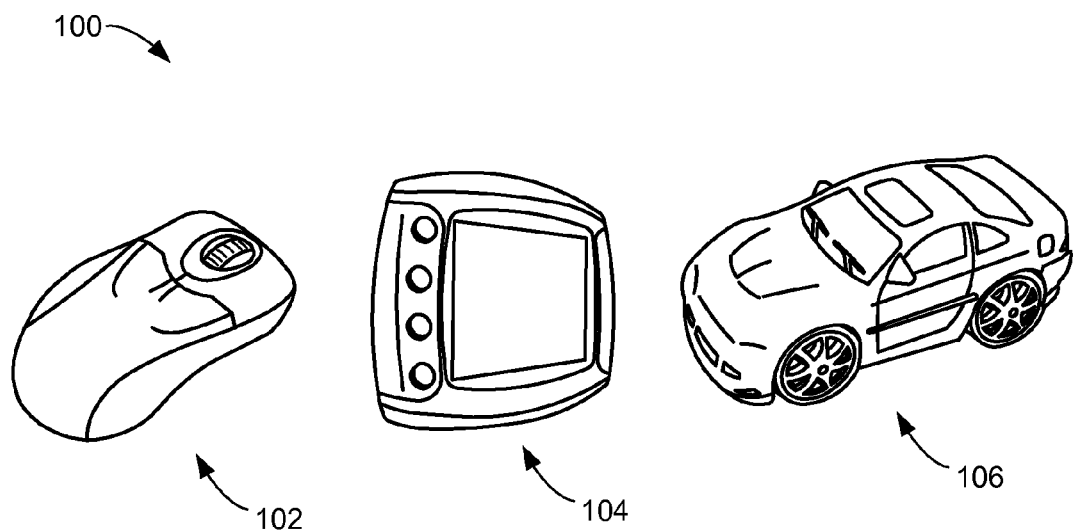
FIG. 1 shows stored-power systems in some exemplary embodiments of the present invention.

The following embodiments are described in sufficient detail to enable those skilled in the art to make and use the invention. It is to be understood that other embodiments would be evident based on the present disclosure, and that method or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and method steps are not disclosed in detail.

The numbering of the embodiments is strictly for ease of description and not as a matter of limitation. Like numbers are used to denote similar elements. Likewise, the drawings showing embodiments of the apparatus/device are semi-diagrammatic and not to scale and, particularly, some of the dimensions are for clarity of presentation and are shown exaggerated in the drawing FIGs.

Similarly, the drawings generally show similar orientations of embodiments for ease of description, but this is arbitrary for the most part. Generally, the various embodiments can be operated in any orientation.

The term "stored-power system" means any device or system powered by a temporary source of power, such as a battery, capacitor, etc., where conserving the temporary source of electrical power is desired; an example used for ease of description is a battery-powered mouse.

Referring now to FIG. 1, therein is shown stored-power systems 100 in some exemplary embodiments of the present invention. The stored-power systems 100 include such systems as a battery-powered computer mouse 102, a battery-powered global positioning system 104, or a battery-powered electric vehicle 106.

In some of the stored-power systems 100, the power draw on the entire battery would be powered-down to a zero power consumption while in others, every major electrical system will be powered-down to zero with minor exceptions; e.g., in the battery-powered electric vehicle 106, a clock would continue to be powered up.

Zero power consumption is defined as a level where there is essentially no drain on the power source. Since this level is a function of the size of the power source, as an example, it refers to less than 1 micro-amp power consumption for a 1.5 volt battery.

Figure 2:
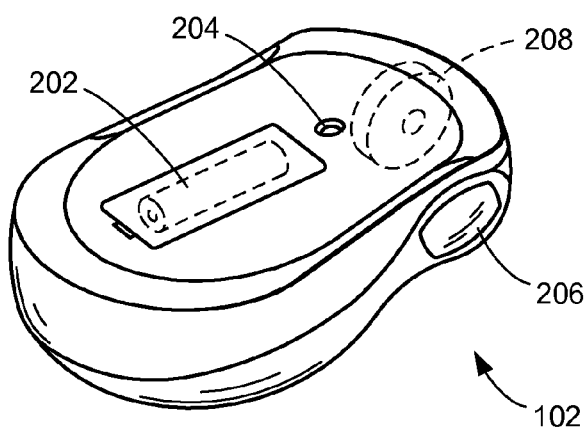
FIG. 2 shows a stored-power system as a battery-powered computer mouse in accordance with a first embodiment of the present invention.

Referring now to FIG. 2, therein is shown the stored-power system 100 as the battery-powered computer mouse 102 in accordance with a first embodiment of the present invention.

The battery-powered computer mouse 102 includes an electrical stored-power source in the form of a battery 202, an additional power using optical tracking system 204, mouse buttons 206, a thumb wheel 208, etc. used for navigation or control.

The optical tracking system 204 receives a power output from the battery 202 to drive a laser chip, which is used to reflect off of a surface and be received by a sensor to provide an input indicative of movement and direction of the battery-powered computer mouse 102.

Figure 3:
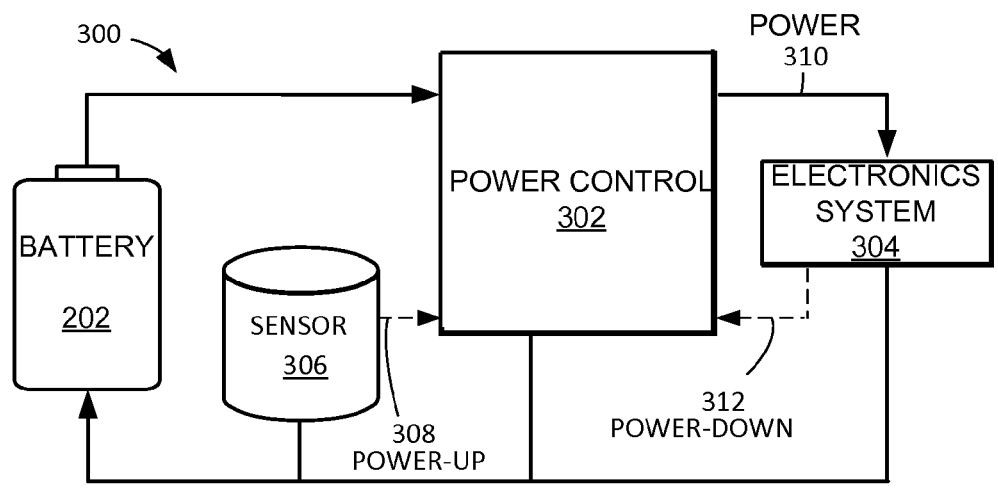
FIG. 3 shows a schematic of components of the battery-powered computer mouse with a power saving control in the first embodiment of the present invention.

Referring now to FIG. 3, therein is shown a schematic of components 300 of the battery-powered computer mouse 102 of FIG. 2 with a power saving control 302 in the first embodiment of the present invention.

The battery 202 is connected to the power saving control 302, which in turn is connected to a power-using-system of the stored-power system, such as an electronics system 304. The electronics system 304 is also connected to the battery 202.

A human-input sensor 306 is connected in parallel to the battery 202. The human-input sensor 306 senses an intentional human input from a person in the form of manual, voice, eye-movement, or other input to provide a zero power consumption power-up signal 308 to the power saving control 302.

The human-input sensor 306 can be any human activation mechanism, such as a mechanical, electro-mechanical, or solid-state switch, the mouse buttons 206 of FIG. 2, the thumb wheel 208, etc. or a capacitive or heat sensor for powering-up the power saving control 302.

Power 310 from the battery 202 passes through the power saving control 302 to the electronics system 304. The electronics system 304 contains circuitry for providing a power-down signal 312 for shutting off power under any desired conditions. For example, the power-down signal 312 may be provided when the battery-powered computer mouse 102 is idle for a predetermined period of time or the mouse buttons 206 are manually pushed down together indicating a desire to shut off power.

Figure 4:
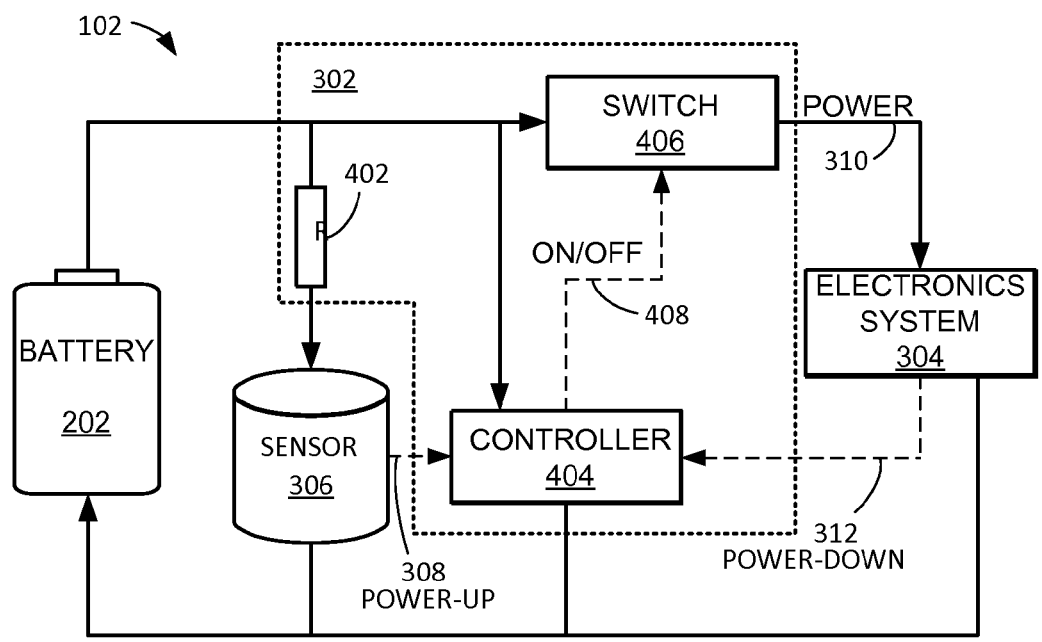
FIG. 4 shows a schematic of a power saving control for the battery-powered computer mouse in the first embodiment of the present invention.

Referring now to FIG. 4, therein is shown a schematic of the power saving control 302 for the battey-powered computer mouse 102 in the first embodiment of the present invention.

The battery 202 is connected through a resistor 402 to the human-input sensor 306. The human-input sensor 306 is connected to provide the power-up signal 308 to a controller 404.

The controller 404 is used to turn a power switch 406 on and off plus monitor the power-down signal 312 from the electronics system 304 and the power-up signal from the human-input sensor 306. The controller 404 is powered from the battery 202 used to power the electronics system 304.

When the electronics system 304 sends the power-down signal 312, the controller 404 sends an on/off signal 408 to turn off the power switch 406, which turns off the power 310 to the electronics system 304.

After the power 310 is turned off, the controller 404 enters a sleep mode in which current consumed from the battery is less than 1 micro-amp. The typical micro-controller supports a sleep mode where power consumption, while sleeping (central processing unit clock and peripherals disabled), may be just nanowatts. In this mode, the controller 404 still retains the ability to detect an event such as a button press or interrupt.

When the human-input sensor 306 is activated, the voltage across the human-input sensor 306 is momentarily pulled to ground (or any other arbitrary voltage level) and this is enough to act as the power-up signal 308 to activate the controller 404. Activation of the controller 404 sends the on/off signal 408 to turn on the power switch 406 and provide the power 310 to the electronics system 304.

Figure 5:
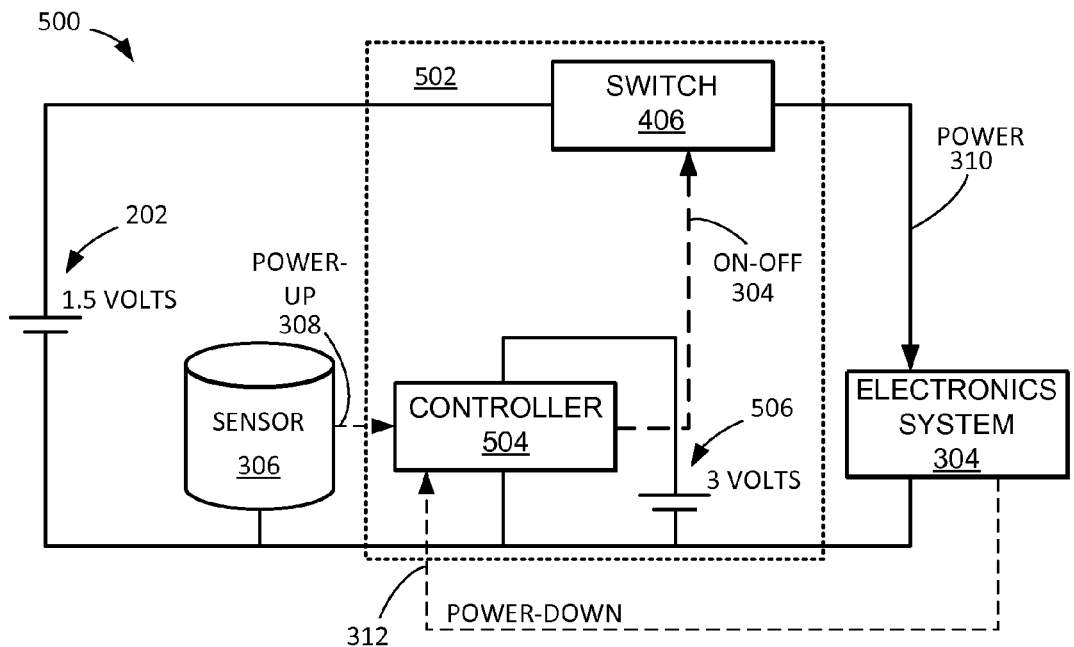
FIG. 5 shows a schematic of a stored-power system with a power saving control using dissimilar voltage sources in a second embodiment of the present invention.

Referring now to FIG. 5, therein is shown a schematic of a stored-power system 500 with a power saving control 502 using dissimilar voltage sources in a second embodiment of the present invention.

A controller 504 is powered from a separate battery 506. The electronics system 304 is powered from the battery 202, which is a 1.5-volt source (e.g., a single AA battery) while the controller 504 is powered from the separate battery 506, which is a 3-volt source (e.g., a lithium coin battery). The dual voltage is useful in implementing the power saving control 502 when the controller 504 is unable to operate from the battery 202. Currently, many controllers will not operate below 2 volts; therefore, a 3-volt source is required.

The controller 504 is responsive to the human-input sensor 306 to turn on the power switch 406 to provide the power 310 to the electronics system 304 and to the electronics system 304 for the power-down signal 312 to turn off the power switch 406 to shut down the power 310 to the electronics system 304.

Figure 6:
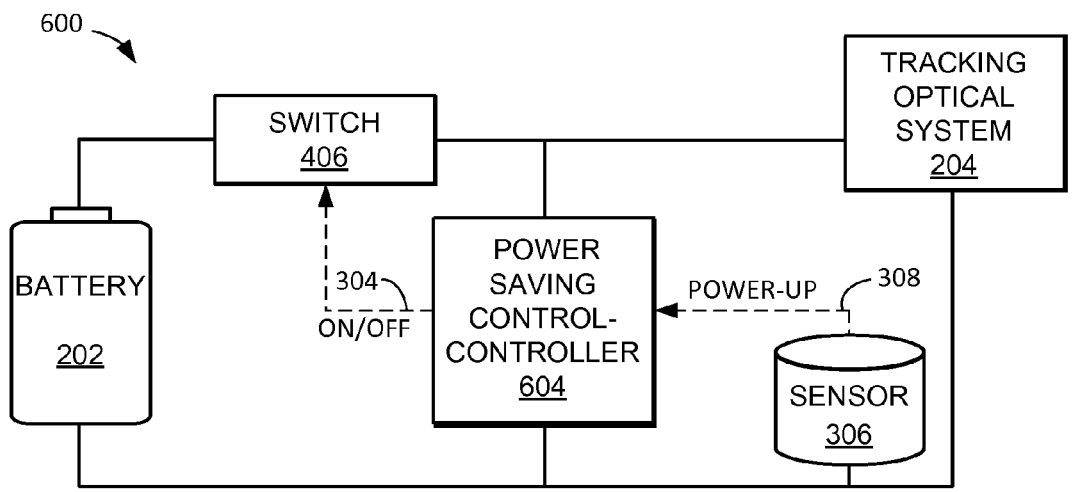
FIG. 6 shows a schematic of a stored-power system power control in a third embodiment of the present invention.

Referring now to FIG. 6, therein is shown a schematic of a stored-power system 600 power control in a third embodiment of the present invention.

The power control includes circuitry such as a power saving control-controller 604, which is a single controller programmed to support all of the functions described above for the power saving control 302 of FIG. 3 and the power saving control 502 of FIG. 5 as well as all of the functions of the electronics system 304.

It has been discovered that his embodiment allows elimination of the separate controllers as well as the separate electronics system and can be implemented by those having ordinary skill in the art from the descriptions previously given.

Figure 7:
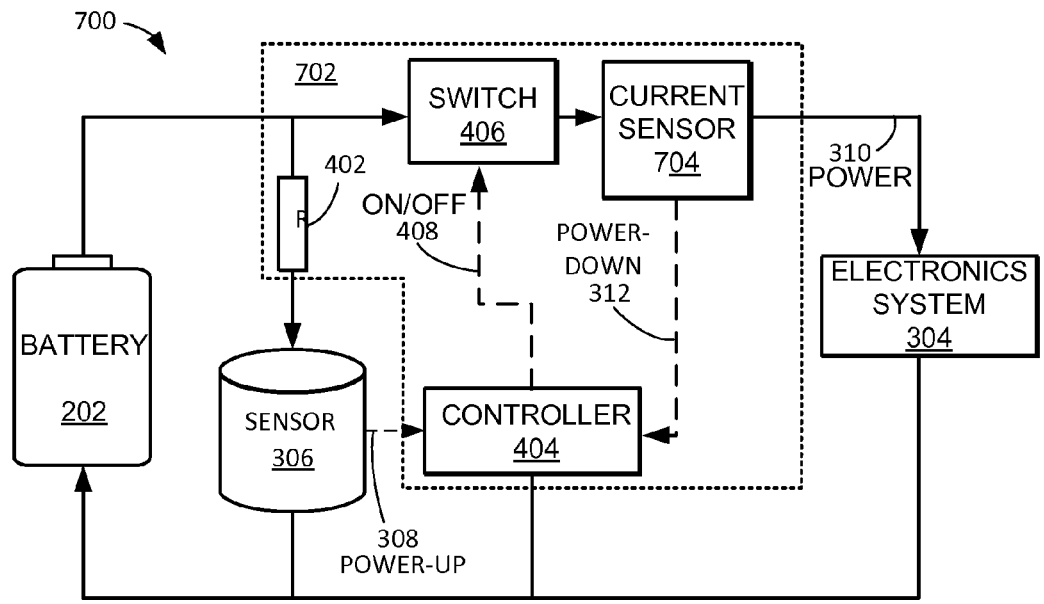
FIG. 7 shows a schematic of a stored-power system with a power saving control using a current sensor in a fourth embodiment of the present invention.

Referring now to FIG. 7, therein is shown a schematic of a stored-power system 700 with a power saving control 702 using a current sensor 704 in a fourth embodiment of the present invention.

In some embodiments, the power-down signal 312 is not supported by the electronics system 304. In this case, a current sensor 704 is used to differentiate power consumption or power load modes. When the electronics system 304 become idle, as determined by reduced current through the current sensor 704, the controller 404 sends an off signal 408 to the switch 406 to turn off the power 310 to the electronics system 304.

The controller 404 provides the on/off signal 408 to turn off the power switch 406, which turns off the power 310 and brings the stored-power system 100 to zero power consumption.

Figure 8:
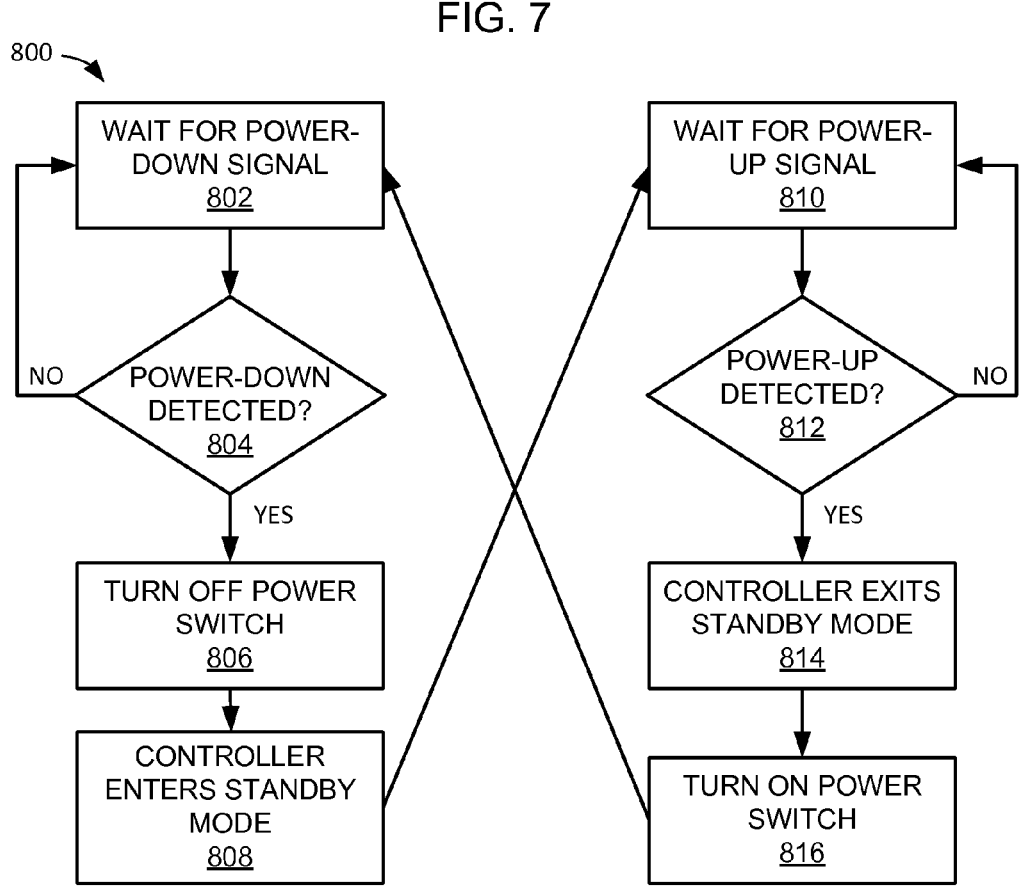
FIG. 8 shows a flow chart of power saving control states in various embodiments of the present invention.

Referring now to FIG. 8, therein is shown a flow chart of power saving control states 800 in various embodiments of the present invention.

While the battery-powered computer mouse 102 of FIG. 1 is in active mode, the controller waits for a power-down signal in a block 802. Once detected in a decision block 804, the power switch is turned off in a block 806. The controller now enters standby mode in a block 808 in which the power consumption is zero or less than 1 micro-amp.

The controller is programmed to wait for a power-up signal in a block 810. When the power-up signal is detected in a decision block 812, the controller exits the standby mode in a block 814 and turns on the power switch in a block 816. The controller then waits for a power-down signal in the block 802.

Figure 9:
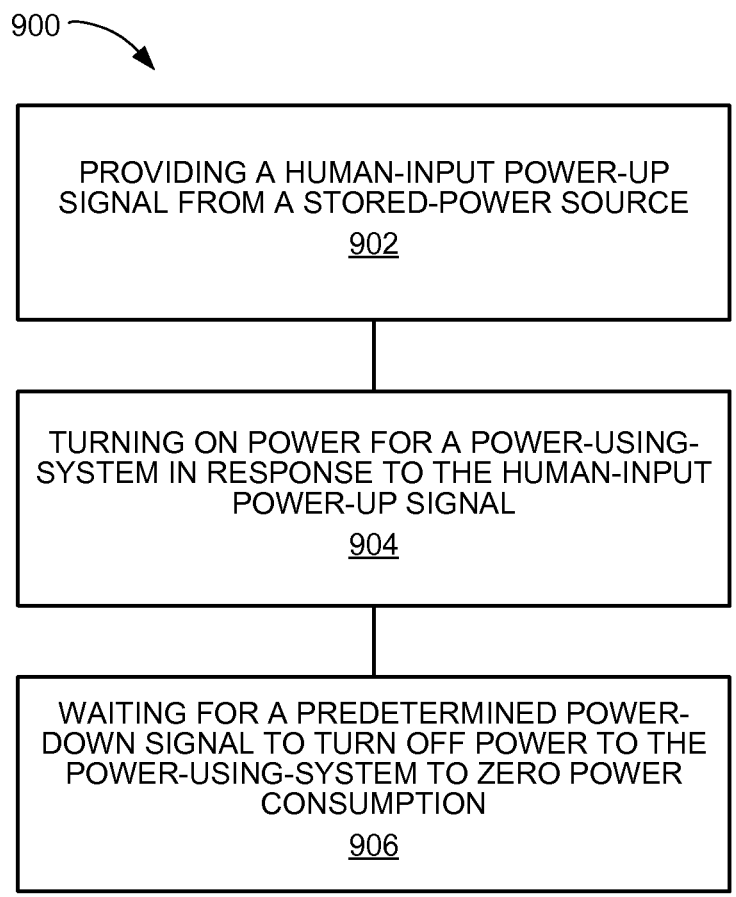
FIG. 9 shows a flow chart of a stored-power system operating method for the stored-power system in accordance with a further embodiment of the present invention.

Referring now to FIG. 9, therein is shown a flow chart of a stored-power system operating method 900 for the stored-power system 100 in accordance with a further embodiment of the present invention. The stored-power system operating method 900 includes: providing a human-input power-up signal from a stored-power source in a block 902; turning on power for a power-using-system in response to the human-input power-up signal in a block 904; and waiting for a predetermined power-down signal to turn off power to the power-using-system to zero power consumption in a block 906.

In various embodiments of the present invention, a power saving method and circuit for battery stored-power systems includes: a battery; a solid-state switch; a power-up stimulus; a power-down stimulus; and a controller wherein the controller turns the solid state switch on in response to the power-up stimulus and off in response to the power-down stimulus for the purpose of limiting power consumed by the battery stored-power system.

In other embodiments of the present invention: the solid-state switch is a mechanical relay; the controller is powered from an additional battery in addition to the battery being used for the battery stored-power system; the controller is able to place itself in standby mode for maximum power savings; a button is used as the power-up stimulus; the power-down stimulus is controlled by a wireless pointing device; the power-up stimulus is supplied by any electro-mechanical input mechanism such as a touch pad, thumb-wheel, etc.; or the battery is rechargeable.

In embodiments of the present invention, a method of minimizing power consumed by a battery stored-power system includes: receiving a power-up stimulus; enabling a solid-state switch to pass power to a battery stored-power system in response to a power-up stimulus; receiving a power-down stimulus; and disabling a solid-state switch to block power to a battery stored-power system in response to a power-down stimulus.

In embodiments of the present invention, a method of minimizing power consumed by a battery stored-power system includes: detecting a low power condition; disabling a solid-state switch to block power to a battery stored-power system; receiving a power-up stimulus; and enabling a solid-state switch to pass power to a battery stored-power system in response to a power-up stimulus.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A stored-power system operating method comprising:
providing a human-input power-up signal from a stored-power source;
turning on power for a power-using-system in response to the human-input power-up signal; and
waiting for a predetermined power-down signal provided by the power-using-system and determined by current, to turn off power to the power-using-system to zero power consumption.

2. The method as claimed in claim 1 wherein providing the human-input power-up signal includes providing a zero power consumption power-up signal.

3. The method as claimed in claim 1 further comprising providing stored-power from two stored-power sources.

4. The method as claimed in claim 1 further comprising providing the predetermined power-down signal in response to a predetermined power load in the stored-power source.

5. The method as claimed in claim 1 further comprising providing an additional power-using-system for receiving an output from the power-using-system and providing an input to the power-using-system.

6. The method as claimed in claim 1 wherein:
providing the human-input power-up signal includes connecting an electrical stored-power source to a controller;
turning on the power in response to the human-input power-up signal includes connecting the electrical stored-power source to an electronics system by the controller;
waiting for the predetermined power-down signal includes waiting for the predetermined power-down signal to the controller to turn off power to zero power consumption in the electronics system and the controller.

7. The method as claimed in claim 6 wherein providing the human-input power-up signal includes causing a voltage change from the electrical stored-power source.

8. The method as claimed in claim 6 further comprising:
providing power from a first electrical stored-power source for the electronics system; and
providing power from a second electrical stored-power source for the controller.

9. The method as claimed in claim 6 further comprising providing the predetermined power-down signal in response to a predetermined power load in the electrical stored-power source includes sensing the current to the electronics system.

10. The method as claimed in claim 6 wherein:
connecting the electrical stored-power source to the electronics system includes connecting a battery to a mouse electronics system; and
further comprising:
providing an output from the mouse electronics system to an optical tracking system connected thereto; and
receiving an input at the mouse electronics system from the optical tracking system.

11. A stored-power system comprising:
a power-using-system for receiving power from a stored-power source for operation and for providing a power-down signal;
a human-input sensor for providing a human-input power-up signal from the stored-power source; and
a power control for:
turning on power to the power-using-system in response to the human-input power-up signal, and
waiting for a predetermined power-down signal determined by current, to turn off the power to the power-using-system to zero power consumption.

12. The system as claimed in claim 11 wherein the human-input sensor is connected to the stored-power source for providing a zero power consumption power-up signal to the power control.

13. The system as claimed in claim 11 further comprising:
a first electrical stored-power source for the power-using-system; and
a second electrical stored-power source for the power control.

14. The system as claimed in claim 11 wherein the power control includes a power load sensor connected to the power-using-system.

15. The system as claimed in claim 11 wherein:
the power-using-system is used in a battery powered device; and
further comprising:
an additional power-using-system associated with the power-using-system for receiving an output therefrom and providing an input thereto.

16. The system as claimed in claim 11 wherein:
the stored-power source is an electrical stored-power source; and
the power-using-system is an electronics system; and
further comprising:
a switch for connecting the stored-power source to the electronics system; and
a controller connected to the human-input sensor and the switch for connecting the electrical stored-power source to the electronics system in response to the human-input power-up signal and for waiting for the predetermined power-down signal to the controller to switch off the switch to zero power consumption in the electronics system and the controller.

17. The system as claimed in claim 16 wherein the human-input sensor is for providing the human-input power-up signal by a voltage change from the electrical stored-power source.

18. The system as claimed in claim 16 wherein:
the electrical stored-power source is a first electrical stored-power source including a battery with a first voltage; and
further comprising:
a second electrical stored-power source for the controller including a second battery having a second voltage different from the first voltage.

19. The system as claimed in claim 16 further comprising a current sensor connected to the controller for providing the predetermined power-down signal in response to a predetermined drain in the electrical stored-power source.

20. The system as claimed in claim 16 wherein:
the electronics system is used in a battery powered mouse; and
further comprising;
an optical tracking system connected to the electronics system for receiving an output therefrom and providing an input thereto.

\* \* \* \* \*